United States Patent [19]
Nager et al.

[11] 3,876,699
[45] Apr. 8, 1975

[54] PURIFICATION OF TETRACYCLINE ANTIBIOTIC

[75] Inventors: Urs F. Nager, Princeton; Peter W. Jackson, Milltown, both of N.J.

[73] Assignee: E. R. Squibb & Sons, Inc., Princeton, N.J.

[22] Filed: Nov. 24, 1972

[21] Appl. No.: 309,577

Related U.S. Application Data
[63] Continuation-in-part of Ser. No. 862,952, Oct. 1, 1969, abandoned.

[52] U.S. Cl. .......................................... 260/559 AT
[51] Int. Cl. .......................................... C07c 103/19
[58] Field of Search .............................. 260/559 AT

[56] References Cited
UNITED STATES PATENTS

| | | | |
|---|---|---|---|
| 2,871,264 | 1/1959 | Minieri et al. | 260/559 AT |
| 2,875,247 | 2/1959 | Fox et al. | 260/559 AT |

*Primary Examiner*—Donald G. Daus
*Assistant Examiner*—Anne Marie T. Tighe
*Attorney, Agent, or Firm*—Lawrence S. Levinson; Merle J. Smith; Burton Rodney

[57] ABSTRACT

A tetracycline antibiotic is obtained free of colored impurities by treating a solution of the antibiotic, obtained from a harvest broth, with an organic base at a low pH.

8 Claims, No Drawings

3,876,699

PURIFICATION OF TETRACYCLINE ANTIBIOTIC

RELATED APPLICATION

This application is a continuation-in-part of copending application Ser. No. 862,952 filed 1 Oct. 1969, now abandoned.

OBJECTS OF THE INVENTION

It is an object of the present invention to provide an improved method for the recovery of a tetracycline antibiotic. Another object is a method for obtaining a tetracycline antibiotic free of colored impurities. These and other objects of the present invention will be apparent from the following description.

SUMMARY OF THE INVENTION

It has now been found that a tetracycline antibiotic may be obtained multi-stage of colored impurities by treating with an organic base a solution of the antibiotic containing colored impurities at a pH in the range of from about 0.5 to about 4.5.

DETAILED DESCRIPTION

The following detailed description of the process of this invention is directed to the recovery of tetracycline. However, it will be understood by those skilled in the art that this process will apply equally well to other tetracycline products such as oxytetracycline, as well as to the recovery and/or purification of these tetracycline antibiotics.

In the recovery from mash the present invention may be carried out according to conventional techniques by first acidifying the mash to solubilize the tetracycline antibiotic contained therein. The mash is acidified to a pH of about 0.5 to about 2.5, preferably to a pH of 1.5 to 1.8 with a strong mineral acid such as hydrochloric acid, sulfuric acid, phosphoric acid, or the like. This acid treatment is carried out at room temperature. The acidified mash is then admixed with a filter aid and filtered to remove fermentation insolubles. To the acidified solution containing the tetracycline antibiotic is then added sodium hydroxide or ammonium hydroxide in an amount to raise the pH to from about 7 to about 11, preferably to a pH of from about 9.1 to about 9.3, thus precipitating a calcium-magnesium-tetracycline antibiotic complex free of quaternary ammonium ion. (An alkali metal carbonate or ammonium carbonate may be added to control the dissolved Ca level.) The complex thus precipitated, after filtration, is then acidified with oxalic acid to a pH of from about 0.5 to about 2.5, preferably to a pH of from about 1.5 to about 1.6, in order to redissolve the tetracycline antibiotic and to form insoluble calcium oxalate which is removed by filtration. (Alternatively, sulfuric acid or a mixture of sulfuric and oxalic acids may be used).

The solution (filtrate) of antibiotic which still contains colored impurities is then treated with from about 0.4 liter to about 1.5 liters of an organic base per kg of tetracycline antibiotic activity while the solution is at a pH of from about 0.5 to about 4.0. The tetracycline is then crystallized from the solution containing the organic base at a pH of from about 4.5 to about 6.0.

The foregoing process to effect the solubilization of colored impurities may be carried out in several differing procedures as will now be described.

1. According to a first procedure, while the solution is at a pH of from about 0.5 to about 2.5, enough organic base is added with agitation to solubilize colored impurities in the antibiotic. Preferably from about 0.5 to about 1.5 l of organic base is added per Kg of tetracycline antibiotic activity in the oxalate solution, and most preferably from about 0.75 to about 1.25 l per Kg of activity.

2. According to a second procedure it has been found that less organic base may be employed by adding it at a pH of from about 0.5 to about 2.5 in two stages with a filtering operation carried out between the two additions. It has been found that the majority of the colored impurities are removed during the filtration and that the amount of organic base necessary to maintain the remaining impurities in solution is substantially less than if all of the organic base is added in one step. Thus, the amount of organic base added in each stage is from about 0.2 l to about 0.6 l of organic base per Kg of tetracycline antibiotic activity in the oxalate solution, preferably from about 0.25 to about 0.5 l per Kg of activity.

3. According to a third procedure, the pH of the solution is raised to a value of from about 2.5 to about 4.0 at which time enough organic base is added to solubilize the colored impurities in the antibiotic. No filtration is necessary. Preferably from about 0.5 to about 1.5 l of organic base is added per Kg of tetracycline antibiotic activity in the oxalate solution, and most preferably from about 0.75 to about 1.25 l per Kg of activity.

An advantage of the present invention is that it provides high yields of essentially pure antibiotic of above 95 percent purity. In addition, the antibiotic obtained is suitable in many cases for direct pharmaceutical use without the necessity of further crystallization and purification procedures.

A feature of the present invention is that no tetracycline-quaternary ammonium complex is formed.

The tetracycline antibiotic activity is determined either by chemical or microbiological assay with reference to a standard which is pure tetracycline hydrochloride which has an activity of 1,000 γ/mg.

The oxytetracycline antibiotic activity is determined in similar manner with reference to an oxytetracycline standard. cylindrical The color of tetracyclines prepared according to this invention is measured with spectrophotometry by comparison of their methanolic solutions (C=1.0%) against a tartrazine color reference solution (280 mg/liter of methanol) having an absorbance of 0.63 to 0.64 at 430 ± 2 mµ for a 1 cm path.

Following the instructions of this disclosure, the solution colors will be less than the reference standard, as was the case in the examples cited. Conversely, if the organic bases claimed herein are omitted during recovery, the solution colors of the tetracyclines will exceed the standard; such preparations are not suitable for pharmaceutical purposes.

An organic base is employed according to the process of the present invention. Exemplary of such bases are:

a. Primary alkyl amines having from 6 to 12 carbon atoms in a straight or branched chain. This includes such compounds as n-octylamine, n-hexylamine, l-methylheptylamine, decylamine, and so forth.

b. Secondary alkyl amines in which two alkyl groups having between 6 and 9 carbon atoms are attached to the nitrogen. These chains may be straight or branched and the alkyl groups may be identical or differ within the indicated limitation. Examples of this type of compound are di-n-hexylamine, di-n-octylamine, n-hexyl-n-octylamine, di-2-ethylhexylamine, di-heptylamine.

c. 1-short chain alkyl (or 1-hydroxy substituted short chain alkyl)-2-long chain alkyl-imidazolines. In these compounds, the short chain alkyl group has between 1 and 4 carbon atoms and an hydroxyl group may be substituted on any of these carbon atoms. The alkyl group on the 2-position has between 7 and 17 carbon atoms. A number of these compounds are commercially available and they include such compounds as Amine C (Geigy Chemical Corporation), Amine O (Geigy), Amine S (Geigy), Amine 121 (a 1-β-hydroxyethylimidazoline prepared from the mixture of amines derived commercially from coconut oil, such that the 2-position of the imidazoline is substituted with a mixture of alkyl groups of from about 7 to 17 carbon atoms).

(d) Primary phenyl alkyl amines in which the alkyl group has 1 to 3 carbon atoms such as benzylamine, phenethylamine, α-methylbenzylamine, α-ethylbenzylamine and so forth.

(e) Long chain alkyl-tri-short chain alkyl ammonium halides wherein the long chain has 8 to 18 carbon atoms, the short chains have 1 to 3 carbon atoms and the halide is chloride, bromide, or iodide. A variety of these compounds are commercially available and useful in this process, such as octadecyltrimethylammonium chloride, decyltriethylammonium chloride, dodecyltrimethylammonium bromide, cetyltrimethylammonium chloride, mixtures of trimethylammonium salts of the mixture of amines derived by a commercially operated process from soybean fatty acids, from coconut oil fatty acids and from other such sources.

f. Long chain alkyl-di-short chain alkyl-benzylammonium halides wherein the long chain alkyl group has from 8 to 18 carbon atoms, the short chain alkyl groups have from 1 to 3 carbon atoms each and the halide is either chloride, bromide, or iodide. A number of these compounds are commercially available or may be easily prepared such as cetyl-dimethylbenzyl-ammonium-chloride, Onyx BTC 824 (a mixed alkyl-dimethylbenzyl-ammonium chloride), Onyx BTC 927 (a mixed alkyl-dimethyl-(dimethylbenzyl)-ammonium chloride), dodecyl-diethyl-benzylammonium bromide.

g. (Medium chain alkyl) benzyl-tri-short chain alkyl ammonium halides wherein the medium chain attached to the benzyl group (at the ortho, meta or para position) has 4 to 8 carbon atoms and the short chain alkyl groups have 1 to 3 carbon atoms each. Compounds of this nature are commercially available and include (tertiarybutyl)benzyl-trimethylammonium chloride, (tertiary-octyl)benzyl-triethylammonium chloride, (n-hexyl)benzyl-tripropylammonium bromide, etc.

h. Di-medium chain alkyl-di-short chain alkyl ammonium halides wherein the medium chain alkyl groups have from 6 to 18 carbon atoms, and the short chain alkyl groups have 1 to 3 carbon atoms. The halide is bromide, chloride, or iodide. Examples include didodecenyl dimethyl ammonium chloride, dioctyl dipropyl ammonium bromide, didecyl diethyl ammonium iodide, di-2-ethylhexyl diethyl ammonium chloride, etc.

i. 1-short chain alkyl-2-long chain alkyl-3-short chain alkyl (or benzyl) imidazolinium halides wherein the short chain alkyl group has from 1 to 4 carbon atoms and may be substituted with an hydroxyl group on any one of these carbon atoms. The long chain alkyl group has from 7 to 17 carbon atoms. A number of these compounds are commercially available, being formed by quaternization of the corresponding imidazoline compounds with an alkyl halide or an aralkyl halide. Examples of this type of compound include Quaternary 121Q$b$ which is an imidazolinium chloride with a β-hydroxyethyl substituent at the 1-position and a benzyl group at the 3-position prepared from the imidazoline formed from the amines derived from coconut oil fatty acids and Quaternary 121Q$c$, a compound of similar structure with a chlorobutyl group at the 3-position.

j. (Medium chain alkyl)phenoxyethoxyethyl di-short chain alkyl benzyl ammonium halides wherein the medium chain alkyl is branched or straight, has 6 to 12 carbons, and it is attached at the ortho, meta or para position to the phenoxy group, the short chain alkyls have 1 to 3 carbons each, and the halide is chloride, bromide or iodide. Examples of such compounds are p-(di-tertiary butyl)phenoxyethoxyethyl dimethyl benzyl ammonium chloride, p-hexyl-phenoxyethoxyethyl diethyl benzyl ammonium bromide, o-decyl-phenoxyethoxyethyl dipropyl benzyl ammonium iodide, etc.

k. N,N'-di(medium chain alkyl benzyl) dimethyl ammonium acetyl ethylenediamine dihalide wherein the medium chain alkyl substituted on the ring of the benzyl group is of 6 to 12 carbons and the halide is chloride, bromide, or iodide. Examples include the p-ditertiary butyl benzyl compounds, the o-hexyl compounds, the p-dodecyl compounds, etc.

l. N-(long chain alkanoyl ethanolaminoformylmethyl)pyridinium halides, wherein the long chain alkanoyl group is a carboxylic acid group having 8 to 18 carbons and the halide is bromide, chloride or iodide. Examples include N-(lauroyl ethanolaminoformylmethyl) pyridinium chloride (Emcol E 607), N-(stearyl-ethanolaminoformylmethyl)pyridinium bromide, N-(tetradecanoyl ethanolaminoformylmethyl) pyridinium iodide.

Preferred organic bases to be employed in the present invention are quaternary ammonium compounds represented by the following general formula:

wherein $R_1$ is entering lower alkyl or benzyl radical, $R_2$ is a long fatty chain of at least 8 carbon atoms, $R_3$ is a lower alkyl radical, $R_4$ is a lower alkyl radical, and $R_1$ and $R_4$ when taken together represent a divalent carbon chain of 2 to 5 carbon atoms. Thus, nitrogen may be part of the heterocyclic ring as in compounds of the Onamine RO type such as those depicted below:

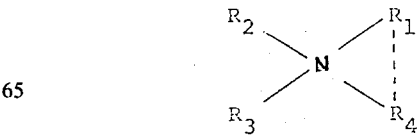

wherein $R_1$, $R_2$, $R_3$ and $R_4$ have the meaning indicated above.

The quaternary ammonium compounds known as the Arquads are particularly effective carriers for the herein described (isolation) process. These compounds are primarily alkyltrimethylammonium chlorides and may be represented by the formula $R-N(CH_3)_3Cl$ wherein R is a long chain alkyl group having at least 8 carbon atoms.

These particular quaternary ammonium compounds are marketed by Armour and Company under the trade-name "Arquad." A variety of compounds of this class are available varying as to the length and number of long chain alkyl groups attached to the nitrogen atom. Listed below are some representative Arquads which are available commercially and which may advantageously be used in carrying out the present invention.

ARQUADS--AVERAGE COMPOSITION OF ACTIVE INGREDIENTS

| Substituent Groups | Carbon Chain Length | Arquad 12 | Arquad 16 | Arquad 18 | Arquad S-2C |
|---|---|---|---|---|---|
| | | Percent | Percent | Percent | Percent |
| Octyl | 8 | — | — | — | 4 |
| Decyl | 10 | — | — | — | 5 |
| Dodecyl | 12 | 90 | — | — | 23 |
| Tetradecyl | 14 | 9 | — | — | 9 |
| Hexadecyl | 16 | — | 90 | 6 | 9 |
| Octadecyl | 18 | — | 6 | 93 | 10 |
| Octadecenyl | 18 | 1 | 4 | 1 | 18 |
| Octadecadienyl | 18 | — | — | — | 22 |

| Substituent Groups | Carbon Chain Length | Arquad C | Arquad S | Arquad 2C | Arquad 2HT |
|---|---|---|---|---|---|
| | | Percent | Percent | Percent | Percent |
| Octyl | 8 | 8 | — | 8 | — |
| Decyl | 10 | 9 | — | 9 | — |
| Dodecyl | 12 | 47 | — | 47 | — |
| Tetradecyl | 14 | 18 | — | 18 | — |
| Hexadecyl | 16 | 8 | 10 | 8 | 30 |
| Octadecyl | 18 | 5 | 10 | 10 | 70 |
| Octadecenyl | 18 | 5 | 35 | — | — |
| Octadecadienyl | 18 | — | 45 | — | — |

Once the impurities are held in solution by the presence of the organic base, the antibiotic-oxalate solution may be treated more or less conventionally, that is, by the addition of a chelating agent for any remaining calcium, magnesium, iron, and the like, by the addition of a reducing and stabilizing agent such as, for example, sodium sulfite or sodium bisulfite, and by crystallization of the tetracycline present in the solution by the addition of ammonium hydroxide or sodium hydroxide until the isoelectric point of tetracycline is reached (or at a pH of about 4.0 to 5.8).

The advantage of the present invention over prior art processes resides primarily in the fact that the undesired colored impurities are held in solution and do not precipitate during the crystallization of the antibiotic; thus the color-free product is directly obtained in high yield, which is essentially of a pharmaceutical grade, well above 95 percent purity, in most cases.

The following examples illustrate the present invention without, however, limiting the same thereto.

EXAMPLE 1

The pH of 55,000 l of tetracycline broth assaying 9.5 g of Activity per l is adjusted to 1.5 with concentrated sulfuric acid and agitated. Filter aid is added in a ratio of about 3 percent weight per volume solid basis and the mixed broth is passed through a stainless steel drum-type filter. The filter cake from this step is washed with water and the combined filtrate and wash collected. The pH of the collected filtrate and wash is adjusted to 9.1 by the addition of a 25% (wt./wt.) solution of sodium hydroxide. The resulting slurry is then filtered on a precoat rotary vacuum filter. The cake is washed with 5,000 l of water, collected, mixed with water, and pumped to a holding tank. 480 Kg of powdered oxalic acid are added as rapidly as possible to this slurry. The resulting mixture is then agitated for 10 minutes, the pH adjusted to 1.5 by adding more oxalic acid, and the mixture then filtered on a rotary filter precoated with Hyflo. The cake is washed with water and the combined filtrate and wash sent to a crystallizer. When a sufficient quantity of rich oxalate filtrate has been collected (1,500 l), it is divided into three aliquots of 500 l. To a first aliquot there are added 89 l of a 50 percent isopropanol solution of Arquad 18, 12.5 Kg of Versene, and 28 Kg of sodium bisulfite with agitation and the pH adjusted to a range of 4.5 to 6 with agitation for 2 hours to complete the crystallization. The tetracycline base is then collected by filtration to obtain a yield of 125 Kg of Activity.

EXAMPLE 2

To the second aliquot there are added 44 l of a 50% isopropanol solution of Arquad 18 and the resulting mixture is agitated for 15 minutes and filtered. To the filtrate there are added 38 l of a 50% isopropanol solution of Arquad 18, 12.5 Kg of Versene, and 28 Kg of sodium bisulfite with agitation. The pH is adjusted to a range of 4.5–6 with agitation for 2 hours to complete the crystallization. The tetracycline base is then collected by filtration to obtain a total yield of 125 Kg of activity.

EXAMPLE 3

The pH of the third aliquot is raised to 3.5 by addition of sodium hydroxide and 89 l of a 50% isopropanol solution of Arquad 18, 12.5 Kg of Versene and 28 Kg of sodium bisulfite with agitation. The pH is then adjusted to the range of 4.5 to 6 with agitation for 2 hours to complete the crystallization. The tetracycline base is then collected by filtration to obtain a total yield of 125 Kg of activity.

EXAMPLE 4

27.8 g of oxytetracycline powder obtained according to conventional methods and containing colored impurities are suspended in 390 ml of deionized water and 9.0 ml of 63% w/w sulfuric acid are added. This produces a clear solution having a pH of 1.2. To the solution are added 54 mg of $NaHSO_3$, 1.66 g of activated charcoal and 1.66 g of filter aid. The resulting mixture is agitated for 15 minutes, filtered and washed. To the filtrate there are added 8.1 ml of Arquad 18, 8.5 ml of ammonia water, and 1.26 ml of a 20% w/v ammonium Versenate solution. The resulting mixture is agitated for 30 minutes to initiate crystallization of the oxytetracycline. 3.9 ml of ammonia water are added and the mixture is then filtered, washed with water and dried for about 3 hours at 50° C in vacuo. The yield is 26.5 g (95.8%) of oxytetracycline free of colored impurities. The oxytetracycline has a potency of 1010 γ/mg on an anhydrous basis.

EXAMPLE 5

Recrystallization of Tetracycline

Off-colored tetracycline (27 gA) is dissolved in water at 25°C by addition of 63% (w/w) $H_2SO_4$ (6.6 ml) to pH 1.2–1.25. Sodium bisulfite (54 mg) is added and the hazy solution is clarified by filtration using activated carbon (2 g) and filter aid (1 g). The filter cake is rinsed with water and the wash is combined with the filtrate.

The filtrate (450 ml) which is still highly pigmented is treated with Arquad S-50 (10.8 ml) to keep the pigments in solution during the ensuing crystallization and isolation steps. After raising the pH of the filtrate to 2.5 with ammonia water, ammonium Versenate solution (270 mg Versene acid) is added followed by more ammonia water to pH 4.5. The tetracycline crystals obtained are filtered off, washed with water and dried.

A light colored product with a bioassay of 1071 γ/mg (anhydrous basis) is obtained in 95% efficiency; a methanolic solution of this preparation is clear and only slightly yellowish.

What is claimed is:

1. A process for removing colored impurities from a solution of fermentation produced tetracycline or oxytetracycline antibiotic which solution is substantially free of tetracycline-quaternary ammonium complex which comprises the steps of adjusting the pH to from about 0.5 to about 4.0 by adding oxalic acid or sulfuric acid or a mixture of the two, adding from about 0.4 liter to about 1.5 liters of organic base per kilogram of antibiotic activity in the solution, and crystallizing the antibiotic from the solution at a pH of from 4.5 to 6, said organic base having a cation of the formula

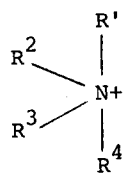

wherein R' is lower alkyl or benzyl, $R^2$ is a fatty acid of 8 to 18 carbon atoms, $R^3$ and $R^4$ are lower alkyl, and R' and $R^4$ taken together are a divalent radical of from 2 to 5 carbon atoms.

2. A process according to claim 1 wherein the antibiotic solution is obtained by dissolving a calcium-magnesium-tetracycline antibiotic complex which is substantially free of quaternary ammonium ion.

3. A process according to claim 1 wherein the antibiotic solution is obtained by dissolving non-complexed tetracycline or oxytetracycline.

4. A process according to claim 1 wherein the acid is oxalic.

5. A process according to claim 4 wherein the organic base is added in one portion.

6. A process according to claim 4 wherein a first portion of organic base is added and the resulting mixture filtered before adding the remainder of the organic base.

7. A process according to claim 4 wherein the pH of the solution is raised to from about 2.5 to about 4.5 before the organic base is added.

8. A process according to claim 1 in which the organic base has a cation of the formula $$R^2-N(CH_3)_3^+$$

wherein $R^2$ is as defined in claim 1.

* * * * *

UNITED STATES PATENT OFFICE
CERTIFICATE OF CORRECTION

PATENT NO. : 3,876,699
DATED : April 8, 1975
INVENTOR(S) : Urs F. Nager and Peter W. Jackson It is certified that error appears in the above-identified patent and that said Letters Patent are hereby corrected as shown below:

Column 1, line 19, "multi stage" should read --free--.
Column 2, line 45, delete "cylindrical".
Column 4, line 54, "entering" should read --a--.

Signed and sealed this 10th day of June 1975.

(SEAL)
Attest:

RUTH C. MASON
Attesting Officer

C. MARSHALL DANN
Commissioner of Patents
and Trademarks